United States Patent [19]
Schupak

[11] Patent Number: 6,069,621
[45] Date of Patent: May 30, 2000

[54] DISTRIBUTED COMPUTER SYSTEM FOR PROVIDING AUDIO, VIDEO, AND INFORMATION SIGNALS TO PLURAL MODULES THROUGHOUT A HOME

[76] Inventor: Donald Schupak, Schupak Group, 730 Fifth Ave., Suite 1901, New York, N.Y. 10019

[21] Appl. No.: 08/655,727

[22] Filed: May 30, 1996

Related U.S. Application Data

[63] Continuation-in-part of application No. 08/240,329, May 10, 1994, Pat. No. 5,557,675.

[51] Int. Cl.[7] .................................. H04N 7/10; H04H 1/00
[52] U.S. Cl. .................................. 345/327; 348/8; 348/10; 348/13; 364/188; 455/6.2; 455/6.3
[58] Field of Search .................................. 345/326, 327; 348/6, 8, 10, 12, 13, 14, 15, 16; 395/200.57, 200.74; 340/825.06, 825.07, 825.08, 825.22, 825.24, 825.25, 825.69, 825.72; 359/146, 147; 364/188–190; 455/3.1, 3.3, 4.1, 4.2, 5.1, 6.1, 6.2, 6.3

[56] References Cited

U.S. PATENT DOCUMENTS

| | | | |
|---|---|---|---|
| 5,485,630 | 1/1996 | Lee et al. ................................ | 455/5.1 |
| 5,500,794 | 3/1996 | Fujita et al. ............................. | 348/8 X |
| 5,574,964 | 11/1996 | Hamlin .................................... | 455/3.1 |
| 5,675,390 | 10/1997 | Schindler et al. ................... | 455/6.3 X |

*Primary Examiner*—John W. Miller
*Attorney, Agent, or Firm*—Cooper & Dunham LLP

[57] ABSTRACT

A distributed computer system for receiving any one of an audio signal, a video signal, or an information signal at a central location and for supplying any one of the audio signal, the video signal, or the information signal to at least one location remote from the central location, including a central computation unit provided at the central location, the central computation unit being adapted to receive any one of the audio signal, the video signal, or the information signal, the central computation unit including a microprocessor, a non-volatile memory, a hard disk drive, a floppy drive, a CD-ROM, and a volatile memory, a data transfer mechanism, and at least one remote module being devoid of disk drives and connected to the central computation unit through the data transfer mechanism for receiving any one of the audio signal, the video signal, or the information signal and being adapted to use the drives of the central computation unit.

25 Claims, 5 Drawing Sheets

DISTRIBUTED COMPUTER SYSTEM FOR PROVIDING AUDIO, VIDEO, AND INFORMATION SIGNALS TO PLURAL MODULES THROUGHOUT A HOME

BACKGROUND OF THE INVENTION

This application is a continuation-in-part of U.S. application Ser.No. 08/240,329, filed May 10, 1994 now U.S. Pat. No. 5,557,675.

1. Field of the Invention

The present invention relates to a computer controlled audio-visual apparatus and, more particularly, to a computer connected to a cable service for controlling at least one of a television, a videocassette recorder, or a compact disk reading/writing device. The computer is also capable of directing video, audio, and/or other information signals from a cable or other source to at least one remote module and of performing computing and gaming operations at such a remote module.

2. Description of the Background

Modern television viewers have a great many choices in deciding upon which programs they wish to view. In addition to the free broadcast channels in the VHF and UHF frequency range that standard television receivers are adapted to receive using an antenna, a television viewer may opt to subscribe to a cable television service and receive additional channels through a cable brought into his home from outside and connected directly to the television receiver. On the other hand, a viewer may purchase a satellite antenna system in order to receive satellite broadcast channels, thereby expanding the frequency coverage otherwise provided by a standard television receiver.

In addition to the basic, or unscrambled channels carried on the cable television and satellite broadcast systems, there may be certain channels that are scrambled, that is, channels that require decoding of an encoded signal before they are in a condition to be displayed on the viewer's television. Upon paying an additional fee the cable subscriber can be provided with a code or decoder to permit viewing the coded programs on a continuous basis or on a pay per-view basis.

Further, it is noted that computers are becoming more and more prevalent in both the office environment as well as the home environment. In regard to this proliferation in the use of computers, particularly in the home, it is noted that different rooms of the home are used for different computing purposes.

For example, computer use in the kitchen may center around the storage and retrieval of recipes, computer use in the den or playroom may center around game playing, computer use in the study may center around word processing or accounting functions, and computer use in the family room may center around multimedia applications involving audio and video display.

However, to install a dedicated computer (including a display, a high-performance CPU, ROM, RAM, and mass storage) in each of these rooms is prohibitively expensive. In addition, the installation of such a large number of dedicated computers is redundant because each computer use does not require all of the capabilities provided by a dedicated computer.

In addition, some of the rooms in a house are not particularly appropriate places to house a large, dedicated computer because of space or environmental concerns. For example, the humid air found in a kitchen can damage floppy disk drives and CD-ROM readers.

OBJECTS AND SUMMARY OF THE INVENTION

Accordingly, it is an object of the present invention to provide a system wherein a computer is connected to a source of audio and video signals and distributes the input signals to at least one of a television, a videocassette recorder, or a compact disk reading/writing device based upon user input.

It is another object of the present invention to provide a system employing a computer for supplying any of a tuned channel, a stored signal, or a descrambled channel to a television.

It is yet another object of the present invention to provide a computer for supplying any of a tuned channel, a stored signal, or a descrambled channel to a plurality of televisions and/or other audio/video components such as, for example, a videocassette recorder or a compact disk reading and/or writing device.

It is yet another object of the present invention to provide a computer for supplying any of a tuned channel, a stored signal, or a descrambled channel to a plurality of televisions and/or other audio/video components such as, for example, a videocassette recorder or a compact disk reading and/or writing device via a radio-frequency transmitter/receiver link.

It is yet another object of the present invention to provide a main computer unit situated in a convenient location that is connected to at least one remote module. The remote modules may be adapted to perform specialized tasks in order to minimize their costs and maximize the efficiency with which they are used.

The above and other objects, features, and advantages of the present invention will become apparent from the following detailed description of preferred embodiments to be read in conjunction with the accompanying drawings.

DETAILED DESCRIPTION OF THE DRAWINGS

Figure 1:
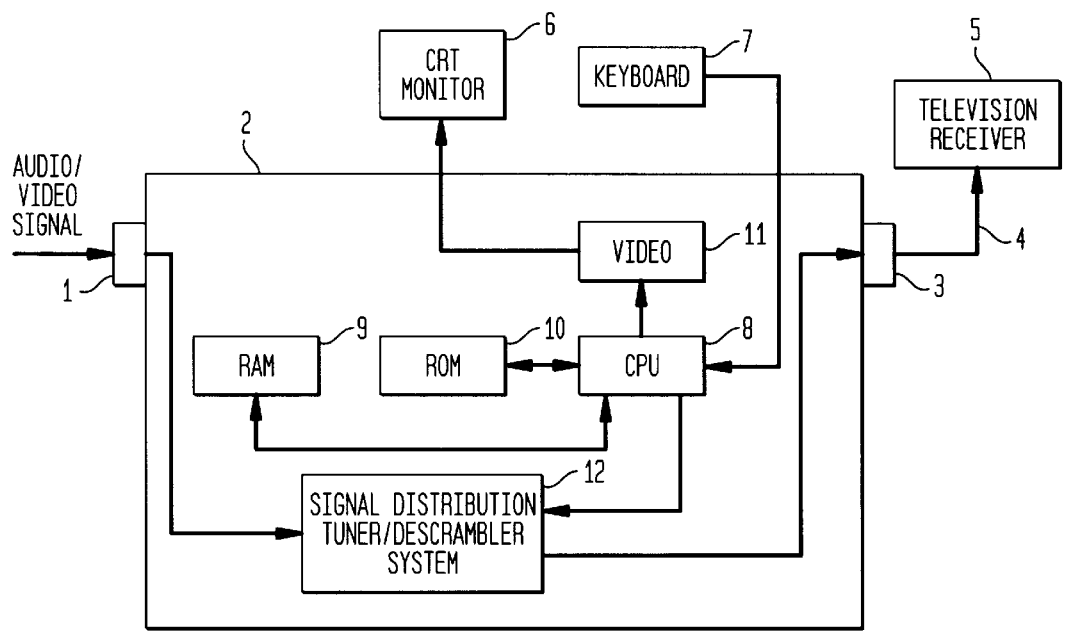
FIG. 1 is a block diagram schematically showing the structure of a computer controlled audio-visual system according to a first embodiment of the present invention.

Referring now to FIG. 1, an audio/video signal is input at a terminal 1 of computer 2 from a program source (not shown), such as a broadcast television antenna, a cable television system, or a satellite broadcast receiver. In addition to the functions described below, the computer 2 is capable of carrying out traditional functions such as, for example, word processing and database storage. The computer 2 outputs an audio/video signal at terminal 3. The output audio/video signal from terminal 3 is carried by cable 4 to television receiver 5. The computer 2 includes a standard CRT monitor 6 and a keyboard 7, as well as a standard control processing unit 8, RAM and ROM memories 9 and 10, video output circuit 11, and signal distribution/tuner/descrambler system 12, shown in more detail in FIG. 2.

Figure 2:
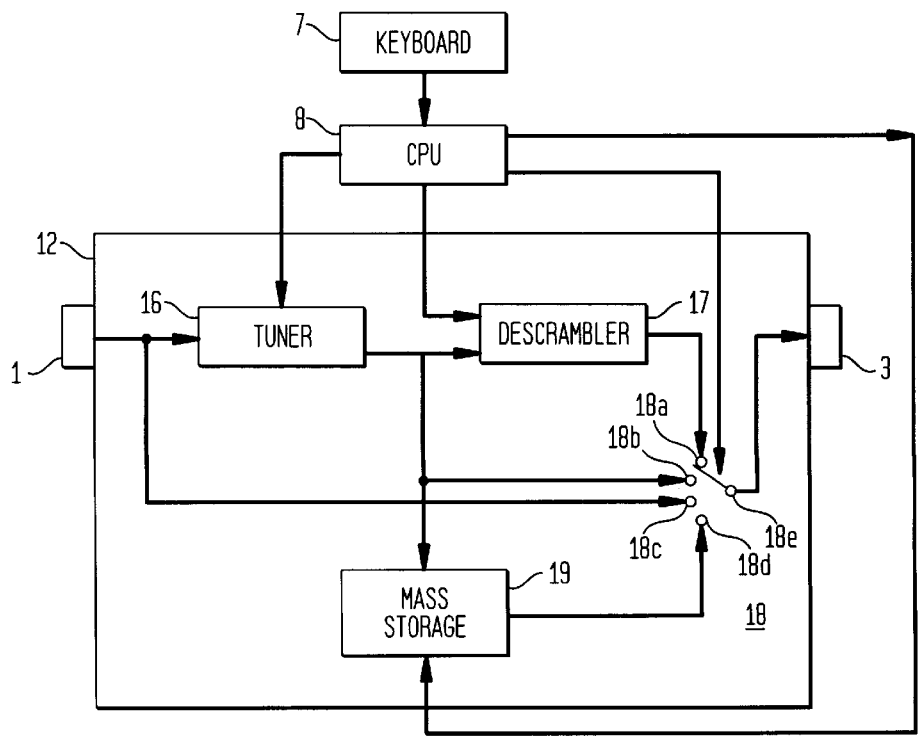
FIG. 2 is a block diagram schematically showing the structure of the computer shown in FIG. 1.

As seen in FIG. 2, system 12 includes a tuner 16 that receives the audio/video signal input at terminal 1 and that is adapted to tune to a particular channel in response to user input by the keyboard 7 connected to the CPU 8. The tuner 16 feeds the selected tuned channel to a descrambler 17. Descrambler 17 decodes, or unscrambles the selected tuned channel that has been scrambled by the program source provider, that is, either the cable television provider or the satellite broadcast provider.

The descrambler 17 descrambles signals based upon an agreement with the program source provider. For example, the descrambler 17 may descramble signals after receiving an access code that is input to the CPU 8 by the user operating the keyboard 7. The access code may be provided either on a program-by-program or month-by-month basis from the program provider.

The descrambler 17 feeds a descrambled signal to contact 18a of switch 18. Switch 18 also receives, at contact 18b, the selected tuned channel that is output from tuner 16, and at contact 18c, the audio/video signal received at terminal 1. Further, the system 12 may include a mass storage unit 19 that receives a signal from tuner 16 and that stores the signal for later replay. The output of mass storage unit 19, that is, the stored tuned signal is fed to contact 18d of switch 18 in response to user input to the CPU 8 from keyboard 7 requesting playback of the stored signal.

Switch 18 is controlled by CPU 8 to provide one of the four signals available at contacts 18a–18d to contact 18e in response to user input to the keyboard 7. Contact 18e in turn provides the selected signal to terminal 3, whereafter the signal is carried by cable 4 to television receiver 5, as shown in FIG. 1.

As seen by the above description, computer 2 receives an input audio/video signal from a program source and may provide, in response to user input, any of a tuned, descrambled signal, a tuned signal, an un-tuned signal, or a stored signal to the television receiver 5.

The mass storage unit 19 may be an optical or magneto-optical mass storage unit and the descrambler 17 may be programmed to descramble signals that have undergone various encoding schemes.

Figure 3:
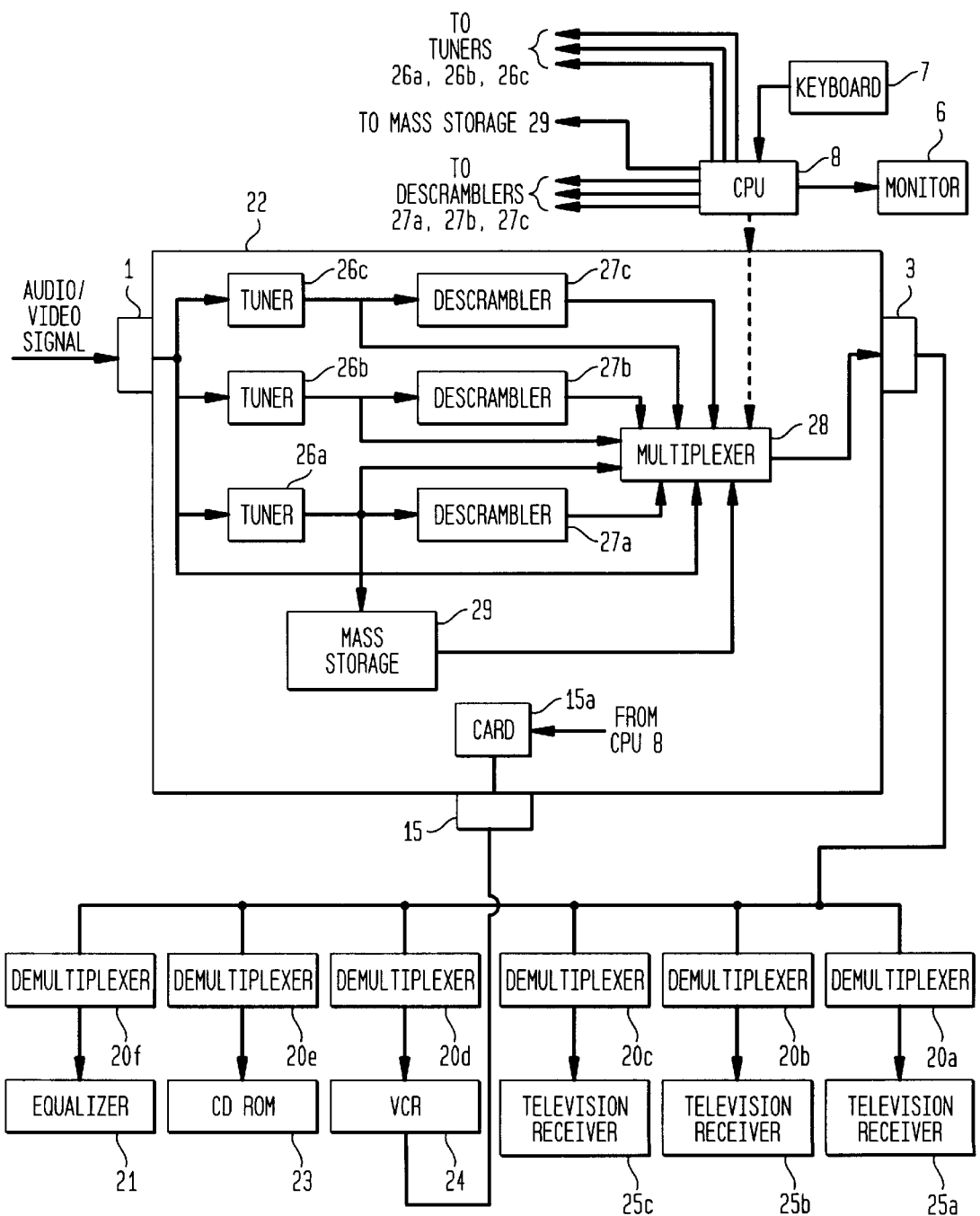
FIG. 3 is a block diagram schematically showing the structure of a computer controlled audio-visual system according to a second embodiment of the present invention.

Turning now to FIG. 3, wherein the same reference numerals of FIGS. 1 and 2 apply to the same parts and therefore do not require detailed description, it is seen that the signal output from terminal 3, which is carried by cable 4, may be received by more than one television receiver, depicted in this Fig. as elements 25a–25c. In this embodiment, the system 22 includes tuners 26a–26c and descramblers 27a–27c. Tuner 26a feeds descramber 27a and mass storage unit 29 as in the first embodiment. Tuner 26a also feeds multiplexer 28 directly. Tuners 26b and 26c receive the input audio/video signal from terminal 1 and, in response to user input to the CPU 8 from the keyboard 7 feed a selected tuned channel to respective descramblers 27b and 27c. The outputs of descramblers 27b and 27c as well as the outputs of tuners 26b and 26c are fed to multiplexer 28. Multiplexer 28 is also supplied with the input audio/video signal. Thus, in response to user input to the CPU 8, multiplexer 28 is capable of multiplexing any of the tuner and descrambler outputs as well as the output from the mass storage unit 29 and the original audio/video signal input to terminal 1. Further, before being passed to the televisions 25a–25c via cable 4, the output of multiplexer 28 is passed through respective demultiplexers 20a–20c. These demultiplexers 20a–20c are adapted to allow each television 25a–25c to receive different channels for display based upon the signals provided by the multiplexer 28 in response to user input to the CPU 8 from the keyboard 7.

Although the descramblers 27a–27c are shown as individual units, they may be embodied by software performed by the computer 2. The multiplexer 28 can also be embodied by software.

In addition, VCR 24, CD Rom 23, and Equalizer 21 may be connected to cable 4 through respective demultiplexers 20d–20f in order to record and/or process signals provided by the system 22 through cable 4.

Further, VCR 24 may be connected to data port 15 of the system 22 via data line 24a. Data Port 15 may receive data from the CPU 8 through control card 15a. Through data card 15a, data port 15 and data line 16 the system 22 is capable of controlling the operating state of the VCR 24. The CPU 8 may be programmed to prompt the user for keyboard input, via the monitor 6, for information regarding the operation of the VCR such as, for example, record start and stop times. It should be noted that the system 22 may also be adapted to control the operating state of other components connected thereto, such as, for example, the equalizer or the CD Rom.

Figure 4:
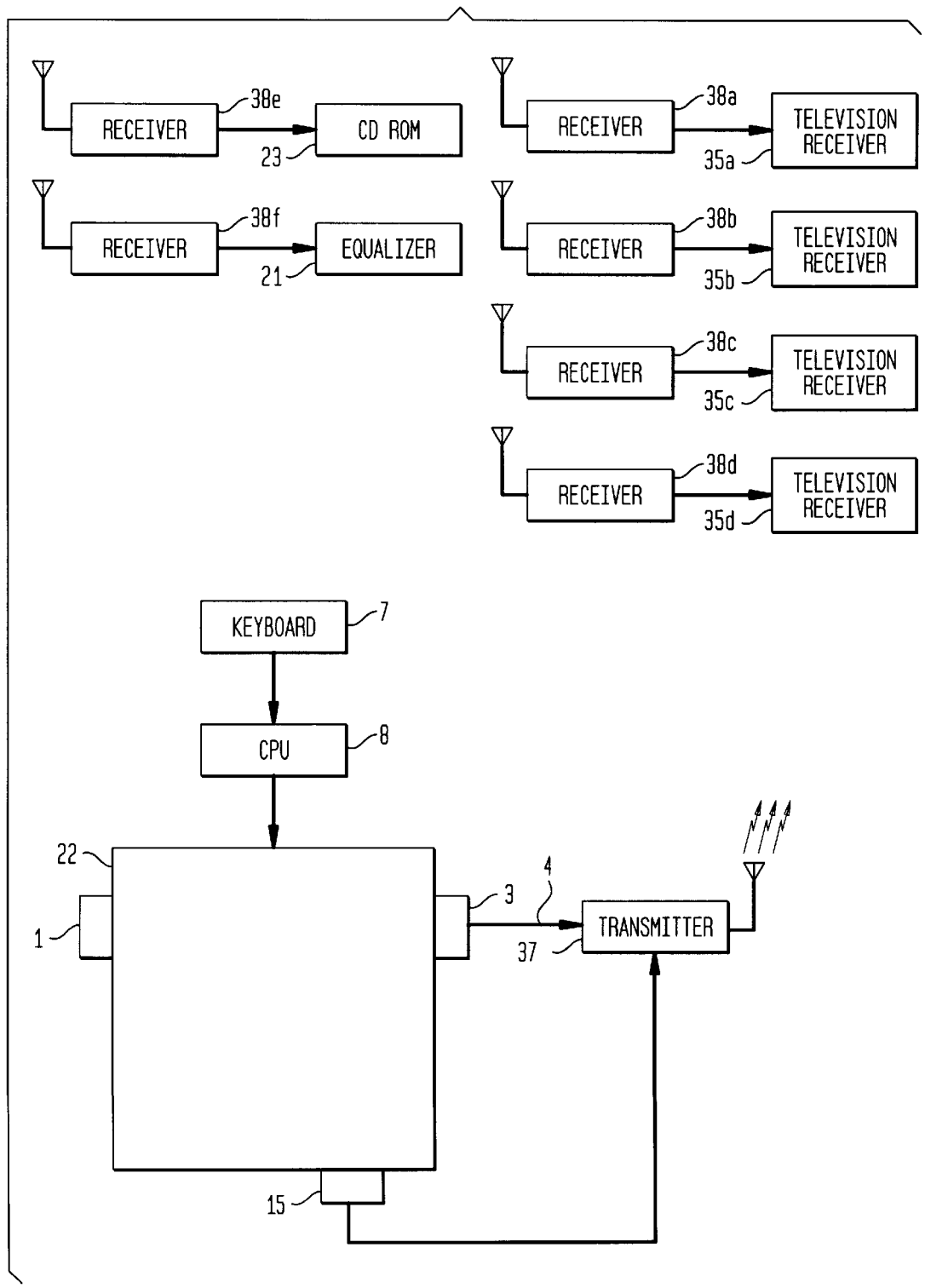
FIG. 4 is a block diagram schematically showing the structure of a computer controlled audio-visual system according to a third embodiment of the present invention.

FIG. 4 shows a third embodiment of the present invention wherein the same reference numerals of FIG. 3. apply to the same parts and therefore do not require detailed description. In this Fig., it is seen that the signal output from terminal 3, which is carried by wire 4, may be transmitted by a wireless transmitter 37 to respective receivers 38a–38f.

In this embodiment the transmitter 37 is connected to the data port 15 of system 22 and controls, in response to user input to the CPU 8 from the keyboard 7, which portion of the multiplexed signal is received by each of the receivers. That is, each receiver may be provided with a different address, and the transmitter 37 may be adapted to transmit a portion of the multiplexed signal to a particular receiver address in response to input from a user to the CPU 8.

Figure 5:
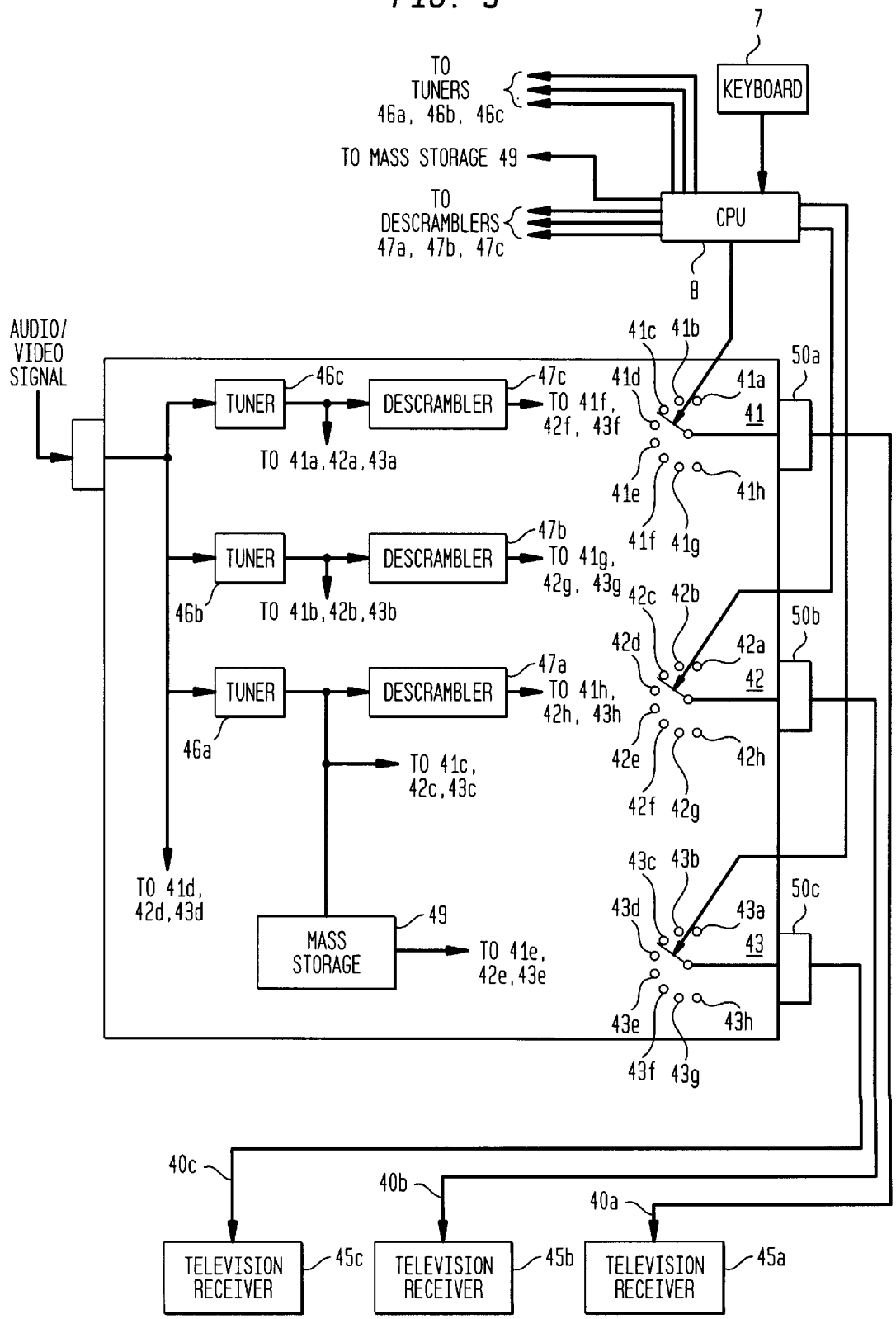
FIG. 5 is a block diagram schematically showing the structure of a computer controlled audio-visual system according to a fourth embodiment of the present invention.

Turning now to FIG. 5 a fourth embodiment of the instant invention is shown, wherein the same reference numerals of FIG. 3 apply to the same parts and therefore do not require detailed description. In this Fig., it is seen that the signal output from tuners 46a–46c, descramblers 47a–47c, mass storage unit 49, and the input audio/video signal are all fed to respective contacts 41a–41h of switch 41, contacts 42a–42h of switch 42, and contacts 43a–43h of switch 43. In response to user input from keyboard 7, switch 41 is controlled by CPU 8 to output any one of the channels input thereto to the television receiver 45a via terminal 50a and cable 40a. Switch 42 is controlled by CPU 8 to output any one of the channels input thereto to the television receiver 45b via terminal 50b and cable 40b. Switch 43 is controlled by CPU 8 to output any one of the channels input thereto to the television receiver 45c via terminal 50c and cable 40c.

While generally communication is shown from the computer to the television receiver, such communication can also flow back to the computer from the television receiver. A touch screen or the like can be provided, or the standard television remote control unit may be utilized, to permit the user remotely located from the computer to provide commands and instructions back to the computer.

Figure 6:
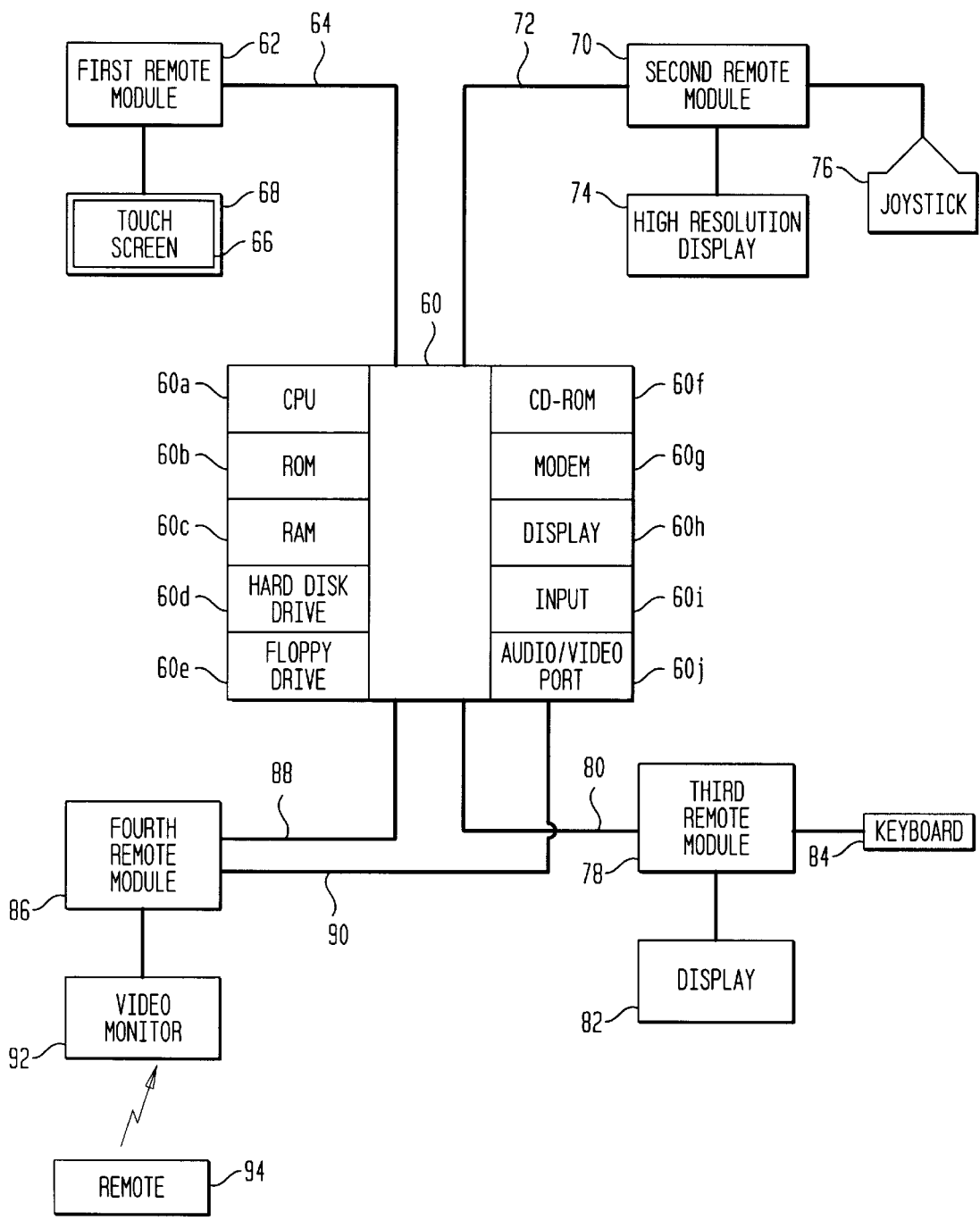
FIG. 6 is a block diagram schematically showing the structure of a distributed computer system according to a fifth embodiment of the present invention.

Referring now to FIG. 6, a block diagram schematically showing the structure of a distributed computer system according to a fifth embodiment of the present invention is shown. As seen in this Fig., central computation unit 60 includes central processor 60a, ROM 60b, RAM 60c, hard disk drive 60d, floppy drive 60e, and CD-ROM reader 60f. Central computation unit 60 also includes modem 60g, for connection to an outside data source such as the Internet, display 60h, input means 60i, which may be a keyboard or a mouse, for example, and audio/video port 60j, for input and output of audio/video information.

The remote modules described below receive any one of an audio signal, video signal or information signal from the central computation unit 60 in response to a message sent from each of the remote modules to the central computation unit 60 and the message controls the audio and the video signal from the central computation unit 60.

In any case, a first remote module 62 may be connected to central computation unit 60 by bi-directional data transfer means 64, which may comprise a radio frequency (RF) link, an infra-red light link, a fiber optic link, or an electrical link, for example. This first remote module 3 may be placed in the kitchen and may include a touch screen 66 integrated into a display 68, for example. The first remote module may utilize the central processor 60a, ROM 60b, RAM 60c, hard disk drive 60d, floppy drive 60e, CD-ROM reader 60f, and modem 60g of the central computation unit 60 so that the first remote module 62 only needs minimal memory storage and data processing capacity, thus minimizing its size and cost.

A second remote module 70 may be connected to central computation unit 60 by bi-directional data transfer means 72, which again may comprise a radio frequency (RF) link, an infra-red light link, a fiber optic link, or an electrical link, for example. This second remote module 70 may be placed in a den and may include a high-resolution display 74 and joystick input devices 76, for example. The second remote module 70 may utilize the central processor 60a, ROM 60b, RAM 60c, hard disk drive 60d, floppy drive 60e, CD-ROM reader 60f, and modem 60g of the central computation unit 60 so that the second remote module 70 only needs minimal memory storage and data processing capacity, thus minimizing its size and cost.

A third remote module 78 may be connected to central computation unit 60 by bi-directional data transfer means 80, which again may comprise a radio frequency (RF) link, an infra-red light link, a fiber optic link, or an electrical link, for example. This third remote module 78 may be placed in a study and may include a high-resolution display 82 and keyboard input device 84, for example. The third remote module 78 may utilize the central processor 60a, ROM 60b, RAM 60c, hard disk drive 60d, floppy drive 60e, CD-ROM reader 60f, and modem 60g of the central computation unit 60 so that the third remote module 78 only needs minimal memory storage and data processing capacity, thus minimizing its size and cost.

A fourth remote module 86 may be connected to central computation unit 60 by bi-directional data transfer means 88, which again may comprise a radio frequency (RF) link, an infra-red light link, a fiber optic link, or an electrical link, for example. Audio/video signal transfer means 90, which may also comprise a radio frequency (RF) link, an infra-red light link, a fiber optic link, or an electrical link, for example, may connect the fourth remote module 86 with audio/video port 60j, for receiving audio/video signals sent from the central computation unit 60. This fourth remote module 86 may be placed in a family room, may be connected to a video monitor 93, and may include a wireless remote control input device 94, for example. The fourth remote module 86 may utilize the central processor 60a, ROM 60b, RAM 60c, hard disk drive 60d, floppy drive 60e, CD-ROM reader 60f, and modem 60g of the central computation unit so that the fourth remote module 86 only needs minimal memory storage and data processing capacity, thus minimizing its size and cost.

Finally, it must be noted that although the present invention is described by reference to particular embodiments thereof, many changes and modifications of the invention may become apparent to those skilled in the art without departing from the spirit and scope of the invention, which is only limited by the appended claims. For example, the remote modules may include any of a volatile-memory, a non-volatile memory, a mass storage device, or a microprocessor to supplement the capabilities of the central computation unit.

What is claimed is:

1. A distributed computer system for receiving one of an audio signal, a video signal, and an information signal at a central location and for supplying said one of said audio signal, said video signal, and said information signal to one of a plurality of locations remote from said central location, comprising:

a central computation unit provided at said central location, said central computation unit being adapted to receive said one of said audio signal, said video signal, and said information signal, said central computation unit including:
a microprocessor,
a non-volatile memory,
a volatile memory,
a modem for connecting to an internet service provider,
display means,
input means,
an audio/video port,
a hard disk drive,
a floppy drive, and
a CD-ROM drive;
bi-directional data transfer means; and
a plurality of remote modules provided at said plurality of locations, wherein one of said plurality of remote modules is provided in a kitchen environment and is connected to said central computation unit through said bi-directional data transfer means for receiving said one of said audio signal, said video signal, and said information signal, and said one remote module being devoid of hard disk drives, floppy drives and CD-ROM drives and being adapted to utilize said hard disk drive, said floppy drive, and said CD-ROM drive of said central computation unit.

2. The system of claim 1, wherein said bi-directional data transfer means is a cable for carrying an electric signal.

3. The system of claim 1, wherein said bi-directional data transfer means is a fiber optic cable for carrying a light signal.

4. The system of claim 1, wherein said bi-directional data transfer means is an infra-red data link.

5. The system of claim 1, wherein said bi-directional data transfer means is a radio-frequency data link.

6. The system of claim 1, wherein said one of said plurality of remote modules receives said one of said audio signal, said video signal, and said information signal from said central computation unit in response to a message sent from said remote module to said central computation unit.

7. The system of claim 6, wherein said one remote module further includes user input means for sending said message.

8. The system of claim 7, wherein said user input means includes a touch-screen.

9. The system of claim 7, wherein said user input means includes a membrane-style keypad.

10. The system of claim 1, wherein said non-volatile memory of said central computation unit is a magnetic disk.

11. The system of claim 1, wherein said non-volatile memory of said central computation unit is an optical disk.

12. The system of claim 1, wherein said non-volatile memory of said central computation unit is a ROM.

13. A computer system distributed throughout a building with a plurality of rooms, comprising:
- a central computation unit provided in one of said plurality of rooms, said central computation unit including:
  - a microprocessor,
  - a non-volatile memory,
  - a volatile memory,
  - a modem for connecting to an internet service provider,
  - display means,
  - input means,
  - an audio/video port,
  - a hard disk drive,
  - a floppy drive, and
  - a CD-ROM drive;
- bi-directional data transfer means; and
- a plurality of remote modules provided in respective other ones of said plurality of rooms, each of said plurality of remote modules being connected to said central computation unit through said data transfer means, wherein said each of said plurality remote modules receives one of an audio signal, a video signal, and an information signal from said central computation unit in response to a message sent from each of said plurality of remote modules to said central computation unit, and said each of said plurality of remote modules being devoid of hard disk drives, floppy drives and CD-ROM drives and being adapted to utilize said hard disk drive, said floppy drive, and said CD-ROM drive of said central computation unit.

14. The system of claim 13, wherein one of said plurality of remote modules further comprises input means having a touch-screen for sending said message from a user and said one of said plurality of remote modules is in a kitchen environment.

15. The system of claim 13, wherein one of said plurality of remote modules further comprises input means having a keyboard for sending said message from a user and said one of said plurality of remote modules is in a study.

16. The system of claim 13, wherein one of said plurality of remote modules further comprises input means having a joystick for sending said message from a user and said one of said plurality of remote modules is in a den.

17. The system of claim 13, wherein one of said plurality of remote modules further includes a display and input means having a keypad for sending said message from a user, said one of said plurality of remote modules is in a den, and said message controls said audio signal and said video signal from said central computation unit.

18. The system of claim 13, wherein said bi-directional data transfer means is a cable for carrying an electric signal.

19. The system of claim 13, wherein said bi-directional data transfer means is a fiber optic cable for carrying a light signal.

20. The system of claim 13, wherein said bi-directional data transfer means is an infra-red data link.

21. The system of claim 13, wherein said bi-directional data transfer means is a radio-frequency data link.

22. The system of claim 13, wherein said non-volatile memory of said central computation unit is a magnetic disk.

23. The system of claim 13, wherein said non-volatile memory of said central computation unit is an optical disk.

24. The system of claim 13, wherein said volatile memory of said central computation unit is a RAM.

25. A method for receiving one of an audio signal, a video signal, and an information signal at a central location and for supplying said one of said audio signal, said video signal, and said information signal to respective ones of a plurality of locations remote from said central location, comprising:
- receiving, at a central computation unit provided at said central location, said one of said audio signal, said video signal, and said information signal, said central computation unit including:
  - a microprocessor,
  - a non-volatile memory,
  - a volatile memory,
  - a modem for connecting to an internet service provider,
  - display means,
  - input means,
  - an audio/video port,
  - a hard disk drive,
  - a floppy drive, and
  - a CD-ROM drive; and
- transferring, through bi-directional data transfer means, to a plurality of remote modules provided in respective ones of said plurality of locations remote from said central location, said one of said audio signal, said video signal, and said information signal from said central computation unit in response to a message sent from each of said plurality of remote modules to said central computation unit plurality of remote modules to said central computation unit, and each of said plurality of remote modules being devoid of hard disk drives, floppy drives and CD-ROM drives and being adapted to utilize said hard disk drive, said floppy drive, and said CD-ROM drive of said central computation unit.

* * * * *